United States Patent
Huang (10) Patent No.: US 8,857,995 B2
(45) Date of Patent: *Oct. 14, 2014

(54) LIGHT SOURCE SYSTEM FOR STEREOSCOPIC PROJECTION

(75) Inventor: Junejei Huang, Taoyuan-Hsien (TW)

(73) Assignee: Delta Electronics, Inc. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/557,546

(22) Filed: Jul. 25, 2012

(65) Prior Publication Data

US 2013/0208247 A1    Aug. 15, 2013

Related U.S. Application Data

(60) Provisional application No. 61/596,832, filed on Feb. 9, 2012.

(30) Foreign Application Priority Data

May 8, 2012    (TW) .............................. 101116327 A (51) Int. Cl.
G03B 21/00    (2006.01)

(52) U.S. Cl.
USPC ........................................................ 353/31

(58) Field of Classification Search
USPC ......... 353/7–8, 20, 30, 31, 33, 37, 38, 50–51, 353/84–85, 94, 98–99; 348/743–747, 348/E9.027; 349/5, 7–9
See application file for complete search history.

(56) References Cited

U.S. PATENT DOCUMENTS

| | | | |
|---|---|---|---|
| 5,282,121 A | 1/1994 | Bornhorst et al. | |
| 6,334,685 B1 | 1/2002 | Slobodin | |
| 7,287,858 B2 * | 10/2007 | Kim et al. | 353/20 |
| 7,322,703 B2 * | 1/2008 | Matsui | 353/84 |
| 2005/0157274 A1 * | 7/2005 | Lin | 353/84 |
| 2007/0127121 A1 | 6/2007 | Maximus et al. | |
| 2010/0208342 A1 | 8/2010 | Olsen | |

FOREIGN PATENT DOCUMENTS

CN    1603887 A    4/2005
TW    M325507    1/2008

* cited by examiner

*Primary Examiner* — Sultan Chowdhury
(74) *Attorney, Agent, or Firm* — Cantor Colburn LLP (57) ABSTRACT

The present invention is a light source system for stereoscopic projection, wherein the light source system has a light source module, a color wheel module, two reflectors and a multiband filter. The light source module is disposed at a first side of a rotary wheel of the color wheel module. Opposite to the light source module, the two reflectors and the multiband filter are disposed at a second side of the rotary wheel. Furthermore, the multiband filter is disposed between and is optically coupled with the two reflectors. With the above arrangements, in different time sequences, the light source system could provide different light beams of different wavebands to a light valve of a projector, which could thus project a right-eye view angle image and a left-eye view angle image to the viewers to form a stereoscopic image.

15 Claims, 10 Drawing Sheets

LIGHT SOURCE SYSTEM FOR STEREOSCOPIC PROJECTION

CROSS-REFERENCES TO RELATED APPLICATIONS

This application claims priority to U.S. provisional application No. 61/596,832 filed on Feb. 9, 2012, and Taiwan Patent Application No. 101116282 filed on May 8, 2012, which are hereby incorporated herein by reference in their entirety.

BACKGROUND OF THE INVENTION

1. Field of the Invention

The present invention relates to a light source system, and more particularly, to a light source system for stereoscopic projection.

2. Descriptions of the Related Art

For most of conventional light source systems for stereoscopic projection, a color wheel or two liquid crystal switches are used to transform a first light beam and a second light beam generated by a light source system into a left-eye view angle image and a right-eye view angle image respectively, and then the left-eye image and the right-eye image are projected to eyes of a viewer.

Specifically, if a color wheel (for example, an RGB color wheel) is used as a light splitting element, then the color wheel must have at least six filtering regions so that three filtering regions (i.e., a red filtering region, a green filtering region and a blue filtering region) are allocated to each of the left and the right eyes. In practical operation, the user can view a stereoscopic image by simply wearing a pair of passive glasses. However, it is difficult to reduce the volume of the color wheel because the color wheel must have at least six filtering regions and the focused point on the filtering regions must be large enough to keep passing light with a small incident angles; in other words, this arrangement makes it difficult to miniaturize the light source system for stereoscopic projection.

On the other hand, if liquid crystal switches are used for light splitting, then the problem that a mechanical mechanism is liable to wear can be solved because the liquid crystal switches require no use of the mechanical mechanism. However, the liquid crystal switches must be operated precisely at a precision higher than that of the color wheel; and furthermore, particular attention shall be paid to the problem of synchronism in the design, and otherwise, it would be impossible for the user to see a stereoscopic image or the stereoscopic image seen would have a poor quality. Briefly speaking, when the liquid crystal switches are used, the light source system for stereoscopic projection becomes relatively complex and costly.

Accordingly, an urgent need exists in the art to provide a light source system for stereoscopic projection that can be used with a pair of passive glasses and that has a low cost, a simplified optical arrangement, a miniaturized volume or improved brightness.

SUMMARY OF THE INVENTION

An objective of the present invention is to provide a light source system with a simplified optical arrangement for stereoscopic projection. Another objective of the present invention is to provide a compact light source system for stereoscopic projection.

To achieve the aforesaid objectives, the present invention discloses a light source system for stereoscopic projection, which comprises a light source module, a color wheel module, two reflectors and a multiband filter. The light source module is disposed at a first side of a rotatable rotary wheel of the color wheel module. The two reflectors and the multiband filter are disposed at a second side of the rotary wheel that is opposite to the first side. The multiband filter is disposed between the two reflectors, and optically couples with the two reflectors. Furthermore, the rotary wheel of the color wheel module has a filtering region and a reflecting region that is symmetrical to the filtering region with respect to a radial direction of the rotary wheel. The filtering region optically couples with the two reflectors as the rotary wheel rotates.

In practical operation, the light source module is adapted to provide a first light beam and a second light beam. The first light beam and the second light beam each have a light path, and the filtering region and the reflecting region of the color wheel module are disposed in the two light paths respectively. When the first light beam or the second light beam passes through the filtering region, a third light beam of a first waveband included in the first light beam or the second light beam can pass through the filtering region; and after passing through the filtering region, the third light beam optically couples with one of the two reflectors, and is reflected by the reflector into the multiband filter. Last, the multiband filter only allows a fourth light beam of a second waveband included in the third light beam to pass therethrough and reflects a fifth light beam of a third waveband included in the third light beam. In other circumstances, if the first light beam or the second light beam is emitted to the reflecting region of the rotary wheel, then the first light beam or the second light beam will be reflected by the reflecting region. The second waveband and the third waveband are contained in the first waveband.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. The present invention relates to a light source module for stereoscopic projection. It shall be appreciated that, in the following embodiments and the attached drawings, description of these embodiments is only for purpose of illustration rather than to limit the present invention. Meanwhile, in the following embodiments and the attached drawings, elements not directly related to the present invention are omitted from depiction; and dimensional relationships among and the number of individual elements in the attached drawings are illustrated only for ease of understanding but not to limit the actual scale, the actual size and the actual number.

Figure 1:
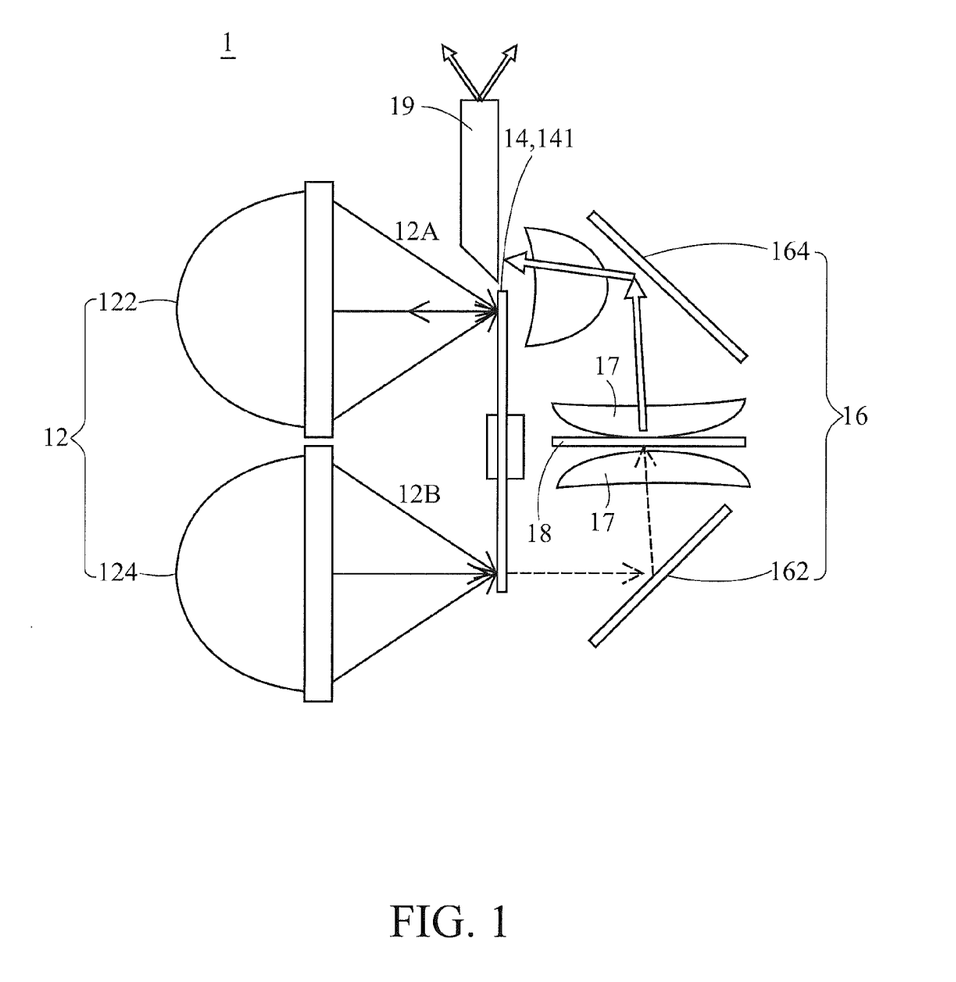
FIG. 1 is a schematic view illustrating a light path of a first embodiment of a light source system for stereoscopic projection according to the present invention in a first time sequence.
Figure 2:
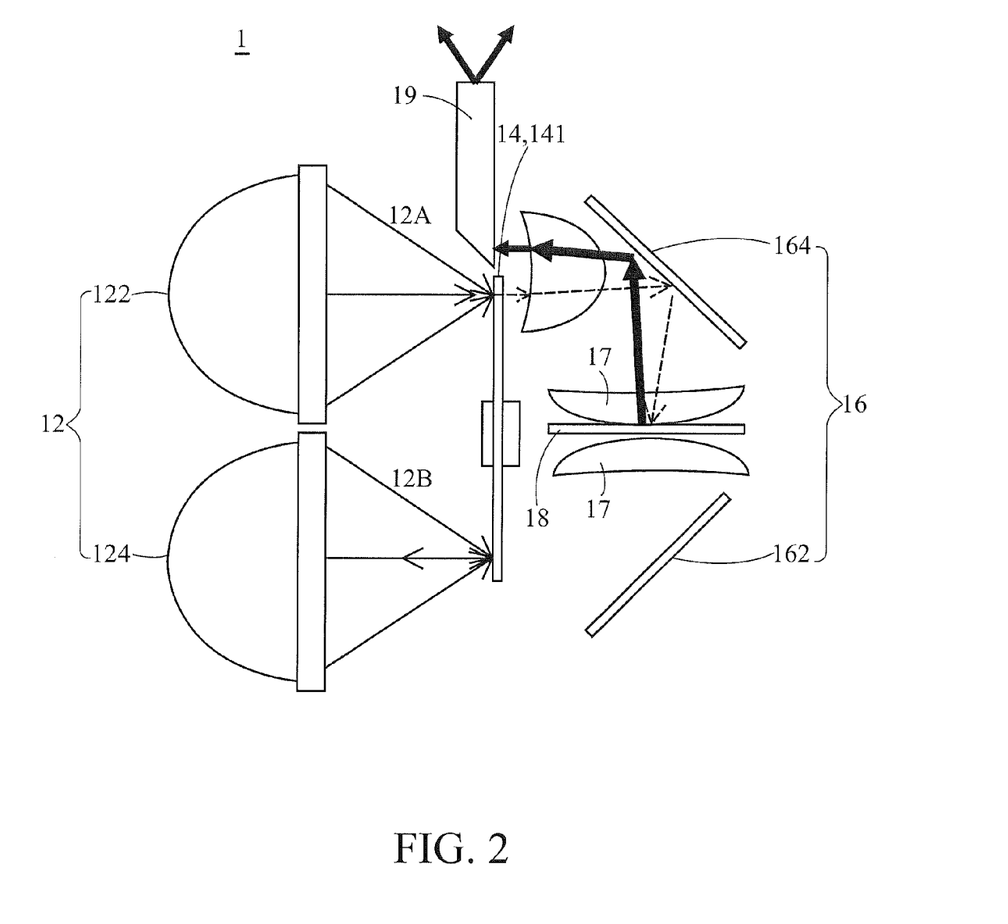
FIG. 2 is a schematic view illustrating a light path of the first embodiment of the light source system for stereoscopic projection according to the present invention in a second time sequence.
Figure 3:
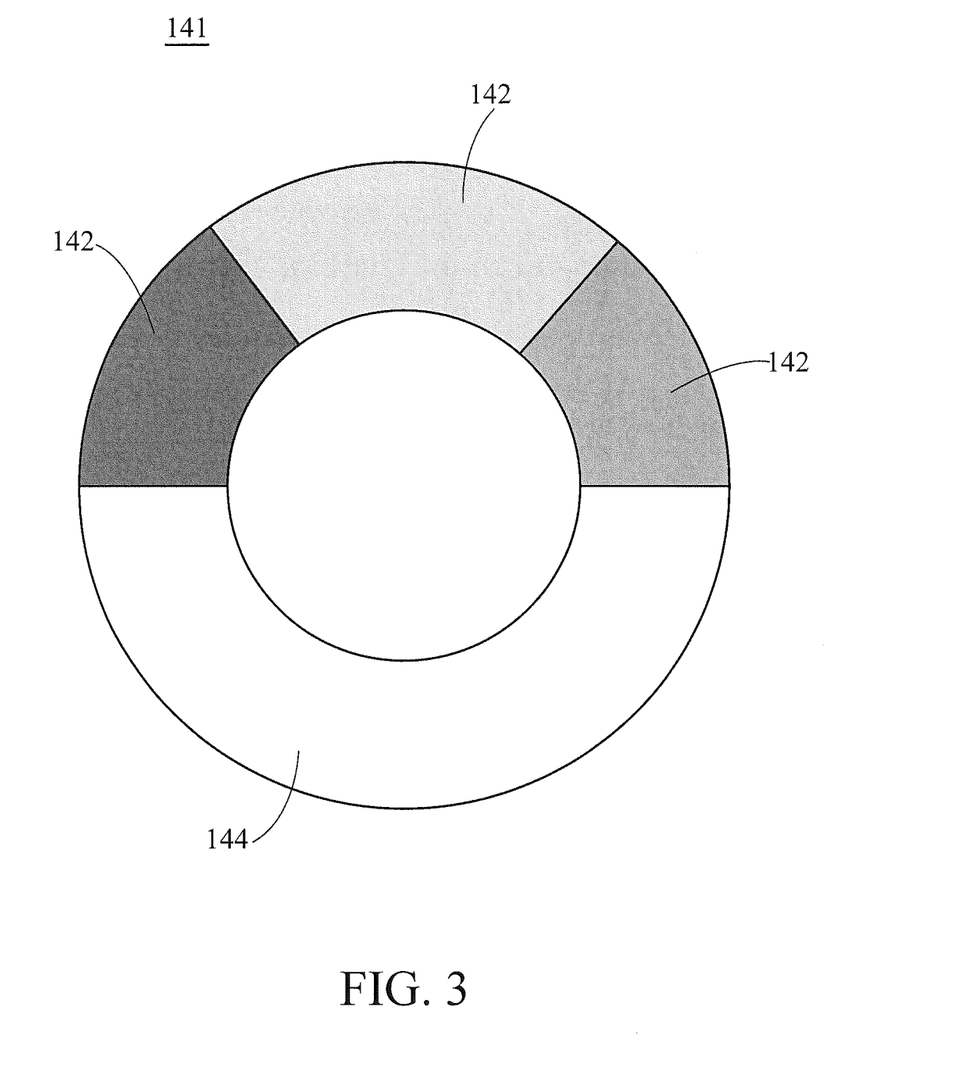
FIG. 3 is a front view of a rotary wheel of a color wheel module in the first embodiment of the light source system for stereoscopic projection according to the present invention.
Figure 4:
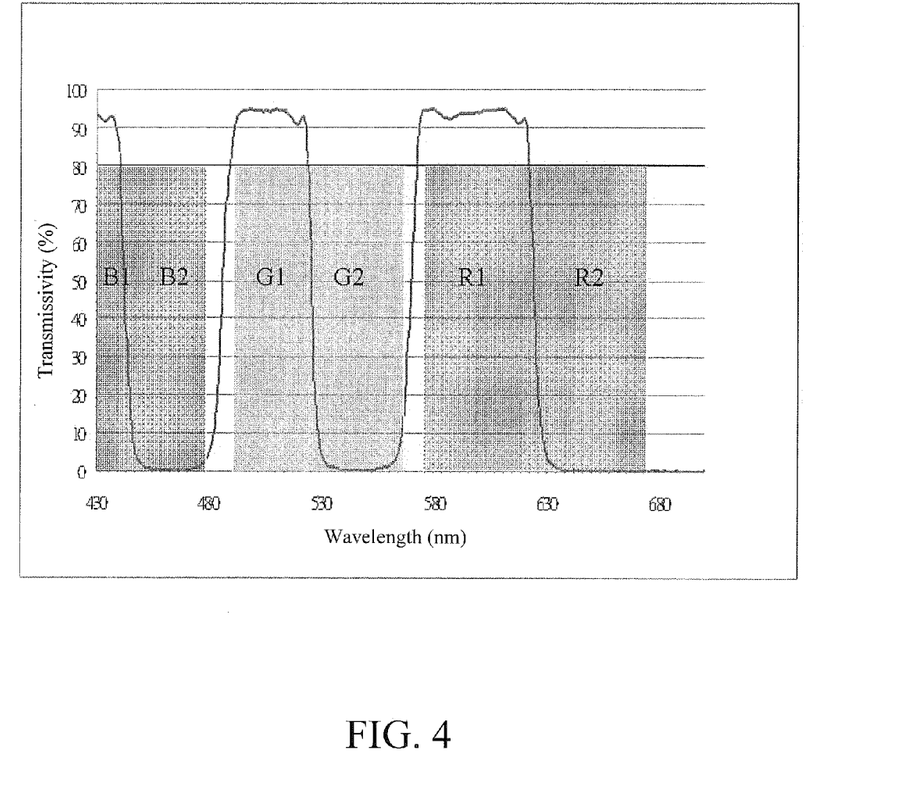
FIG. 4 is a schematic view illustrating wavebands versus transmissivity of a multiband filter in the first embodiment of the light source system for stereoscopic projection according to the present invention.

Please refer to FIG. 1 to FIG. 4 together, FIG. 1 and FIG. 2 are schematic views illustrating light paths of a first embodiment of a light source system for stereoscopic projection according to the present invention in a first time sequence and a second time sequence respectively; FIG. 3 is a front view of a color wheel module in the first embodiment of the light source system for stereoscopic projection according to the present invention; and FIG. 4 is a schematic view illustrating wavebands versus transmissivity of a multiband filter in the first embodiment of the light source system for stereoscopic projection according to the present invention.

In the first embodiment, the light source system 1 for stereoscopic projection may comprise a light source module 12, a color wheel module 14, two reflectors 16 and a multiband filter 18. The light source module 12 may have two light sources 122, 124, which are adapted to generate a first light beam 12A and a second light beam 12B respectively. The two light sources 122, 124 may each be a light source that capable of generating a full-color light (a white color light), and the two light sources 122, 124 could be a high-pressure mercury lamp or the like. In this embodiment, the first light beam 12A and the second light beam 12B are full-color lights.

The color wheel module 14 has a rotary wheel 141 that is rotatable and an actuator (not shown) that is connected to the rotary wheel 141 and that can rotate the rotary wheel 141. In order to clearly show operational relationships between the color wheel module 14 and other elements in the light source system 1 for stereoscopic projection, only the rotary wheel 141 of the color wheel module 14 is depicted.

The light source module 12 may be disposed at a first side (e.g., a front side) of the rotary wheel 141 of the color wheel module 14, and the two reflectors 16 and the multiband filter 18 may be disposed at a second side (e.g., a rear side) of the rotary wheel 141 that is opposite to the first side. Furthermore, the rotary wheel 141 of the color wheel module 14 further has a filtering region 142 (as shown in FIG. 3) and a reflecting region 144 (as shown in FIG. 3) that is symmetrical to the filtering region 142 with respect to a radial direction of the rotary wheel 141. In this embodiment, the filtering region 142 of the color wheel module 14 may further have a red filtering region, a green filtering region and a blue filtering region.

The two reflectors 16 (162, 164) may each be a reflecting mirror to at least reflect a red light, a green light and a blue light. Furthermore, the filtering region 142 can optically couple with one of the two reflectors 16 as the rotary wheel 141 rotates.

It shall be appreciated that, "optically couple" described thereinafter of the present invention generally refers to the propagation or the transition of light beams between optical elements; that is, if two optical elements optically couple with each other, then it means that a light beam from one of the optical elements can propagate or transmit to the other of the optical elements.

The multiband filter 18 can optically couple with the two reflectors 16. The multiband filter 18 may be a transparent plate on which a plurality of optical coatings are disposed to allow light beams of a plurality of specific wavebands to pass therethrough and reflect light beams of a plurality of other specific wavebands. Referring to FIG. 4, in this embodiment, the multiband filter 18 can reflect blue light beams of a waveband B2, green light beams of a waveband G2 and red light beams of a waveband R2, but allow blue light beams of a waveband B1, green light beams of a waveband G1 and red light beams of a waveband R1 to pass therethrough.

Next, the operating process of the light source system 1 for stereoscopic projection will be described. For ease of understanding and description, the operating process of the light source system 1 for stereoscopic projection is divided into a first time sequence and a second time sequence. This division of the operating process is only for convenience of description but not to limit the operation sequence. In the practical operation, the light source system 1 switches between the first time sequence and the second time sequence alternately. Furthermore, for convenience of understanding, the light beams of different wavebands in FIG. 1 and FIG. 2 are depicted by different kinds of arrows.

First referring to FIG. 1 and FIG. 3, in the first time sequence, the reflecting region 144 of the color wheel module 14 rotates to a position corresponding to the light source 122; that is, the reflecting region 144 is now disposed in the light path of the first light beam 12A, and the first light beam 12A generated by the light source 122 will be reflected by the reflecting region 144. After being reflected by the reflecting region 144, the first light beam 12A will be shielded or absorbed by other elements (not shown) without passing through the rotary wheel 141.

Simultaneously, the filtering region 142 of the color wheel module 14 rotates to a position corresponding to the light source 124; that is, the filtering region 142 is now disposed in the light path of the second light beam 12B, and the second light beam 12B generated by the light source 124 will partially pass through the filtering region 142. In detail, only a third light beam (depicted by dashed arrows) of a first waveband included in the second light beam 12B but not all of the second light beam 12B can pass through the filtering region 142.

In this embodiment, because the filtering region 142 has the green filtering region, the red filtering region and the blue filtering region, the first waveband refers to wavebands of the green light, the red light and the blue light correspondingly. As the rotary wheel 141 rotates, the green filtering region, the red filtering region and the blue filtering region are located in the light path of the second light beam 12B in sequence, and the third light beam that can pass through the filtering region 142 would be the green light, the red light and the blue light correspondingly. If the filtering region 142 further has a yellow filtering region, then second light beam may further be filter into a yellow light.

The third light beam passing through the filtering region 142 is propagated to the reflector 162, and is then reflected by the reflector 162 to the multiband filter 18. Then, a fourth light beam (depicted by thick hollow arrows) of a second waveband included in the third light beam passes through the multiband filter 18, and light beams of other wavebands included in the third light beam are reflected by the multiband filter 18. The second waveband is the waveband B1, G1 or R1 shown in FIG. 4, so the fourth light beam is still a green light, a red light or a blue light. The second waveband of the fourth light beam is contained in the first waveband of the third light beam.

Then, the fourth light beam propagates to the reflector 164 and enters into a light valve (e.g., a DMD, an LCD or an LCoS, not shown) of a projector so that the projector can project and form a view angle image (e.g., a left-eye view angle image).

Next please refer to FIG. 2 and FIG. 3, in the second time sequence, the reflecting region 144 of the color wheel module 14 rotates to the position corresponding to the light source 124; that is, the reflecting region 144 is now disposed in the light path of the second light beam 12B, and the second light beam 12B will be reflected by the reflecting region 144 without passing through the rotary wheel 141. The filtering region 142 rotates to the position corresponding to the light source 122; that is, the filtering region 142 is disposed in the light path of the first light beam 12A. Similar to the second light beam 12B in the first time sequence, only the third light beam (depicted by dashed arrows) of the first waveband included in the first light beam 12A can pass through the filtering region 142.

The third light beam passing through the filtering region 142 is reflected by the reflector 164 and transmitted into the multiband filter 18. Then, a fifth light beam (depicted by thick hollow arrows) of a third waveband included in the third light beam is reflected by the multiband filter 18, and light beams of other wavebands included in the third light beam pass through the multiband filter 18. The third waveband is the waveband B2, G2 or R2 shown in FIG. 4, so the fifth light beam is still a green light, a red light or a blue light. The third waveband of the fifth light beam is contained in the first waveband of the third light beam.

Then, the fifth light beam propagates to the reflector 164 and is then reflected by the reflector 164 into the light valve of the projector so that the projector can project and formed another view angle image (e.g., a right-eye view angle image).

In brief, with the above arrangement, the light valve of the projector can receive a fourth light beam of the second waveband and a fifth light beam of the third waveband respectively in the different time sequences so as to respectively form the fourth light beam and the fifth light beam into the left-eye view angle image and the right-eye view angle image for projection to the user. By wearing a pair of glasses having special filters, the left-eye view angle image would enters viewer's left eye and the right-eye view angle image would enters viewer's right eye, and then a stereoscopic image is formed in the brain of the viewer.

The light source system 1 for stereoscopic projection may further have a light homogenizing element 19 that is disposed at a side of the reflector 164 and that optically couples with the reflector 16 so that the fourth light beam and the fifth light beam can be homogenized and uniformed before entering into the light valve of the projector. The light homogenizing element 19 may be a lens array, a fly lens, an integration rod, a light tunnel or the like.

Furthermore, the light source system 1 for stereoscopic projection may further comprise two first lens units 17, which are symmetrically disposed with respect to an axial direction of the rotary wheel 141 of the color wheel module 14 and disposed at two opposite sides of the multiband filter 18 (i.e. the two first lens units 17 sandwich the multiband filter 18.) The two first lens units 17 can collimate the fourth light beam or the fifth light beam.

Figure 5:
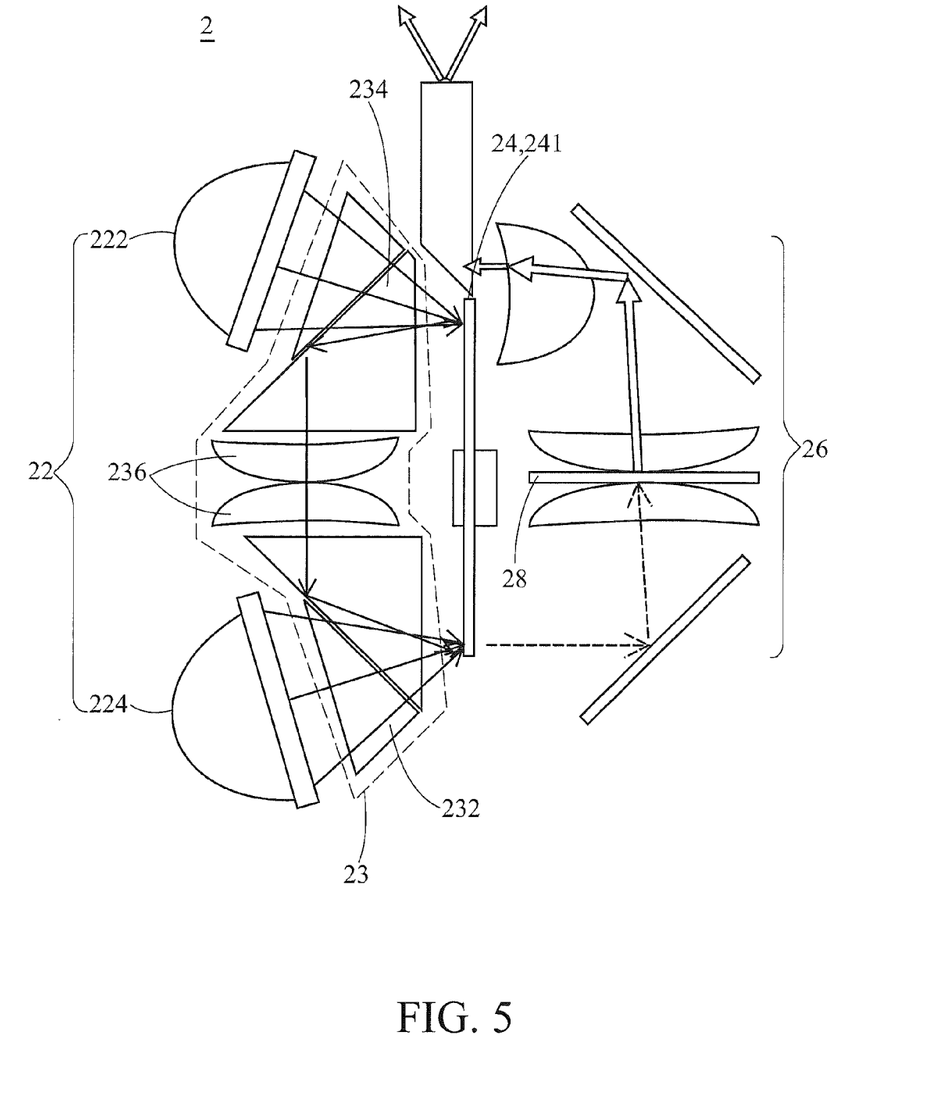
FIG. 5 is a schematic view illustrating a light path of a second embodiment of the light source system for stereoscopic projection according to the present invention in the first time sequence.
Figure 6:
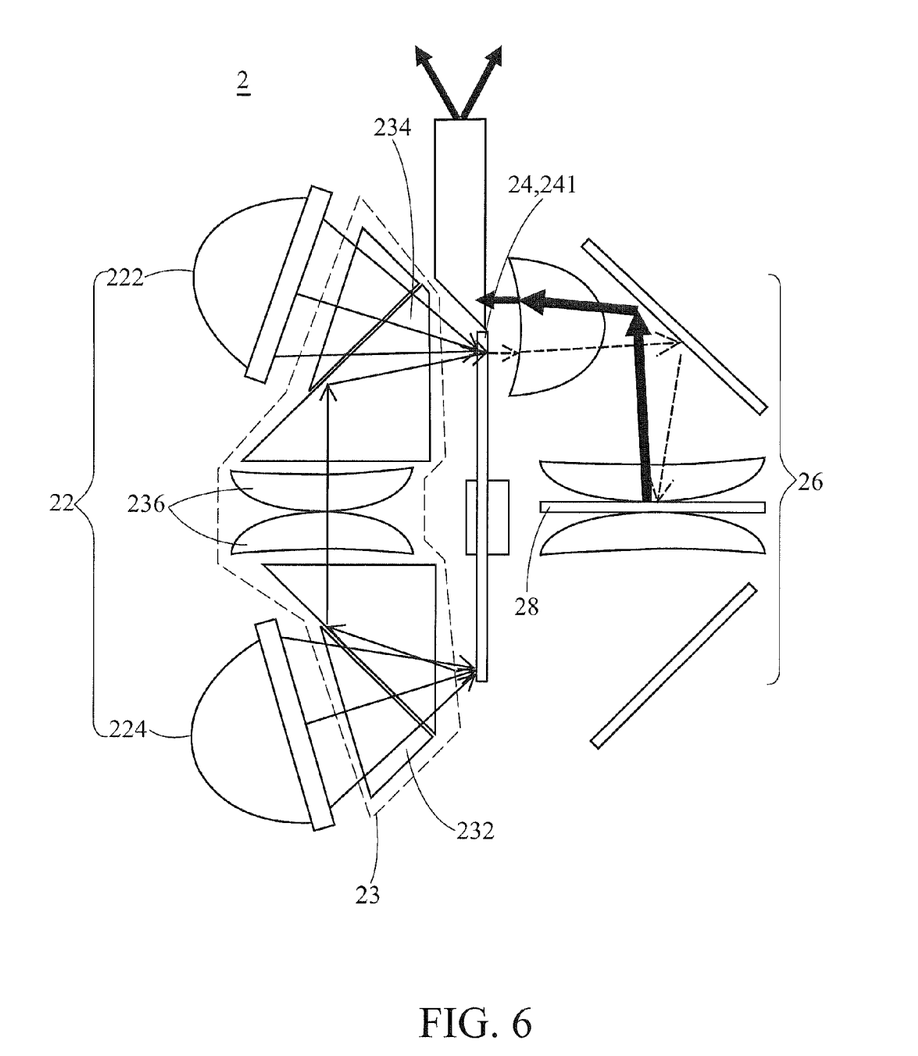
FIG. 6 is a schematic view illustrating a light path of the second embodiment of the light source system for stereoscopic projection according to the present invention in the second time sequence.

Referring to FIG. 5 and FIG. 6, there are shown schematic views illustrating light paths of a second embodiment of the light source system for stereoscopic projection according to the present invention in the first time sequence and the second time sequence respectively. Similar to the light source system 1 for stereoscopic projection of the first embodiment, the light source system 2 for stereoscopic projection of the second embodiment also comprises a light source module 22, a color wheel module 24, two reflectors 26 and a multiband filter 28, and the light source module 22 also has two light sources 222, 224 adapted to generate a first light beam and a second light beam respectively.

The light source system 2 for stereoscopic projection differs from the light source system 1 for stereoscopic projection in two respects: first, the light sources 222, 224 of the light source system 2 for stereoscopic projection include an angle therebetween and each of the lights 222, 224 are obliquely disposed at the first side of the rotary wheel 241 of the color wheel module 24; and second, the light source system 2 for stereoscopic projection further comprises a light recycling unit 23 that is disposed between the two light sources 222, 224 and the rotary wheel 241 of the color wheel module 24.

The first or the second light beam that reflected by the reflecting region (as shown in FIG. 3) of the color wheel module 24 could be guide by the light recycling unit 23 to the filtering region (as shown in FIG. 3) of the color wheel module 24. The light recycling unit 23 may comprise two total internal reflection (TIR) prisms 232, 234 and two lenses 236. The two TIR prisms 232, 234 and the two lenses 236 are symmetrically disposed with respect to the axial direction of the rotary wheel 241 respectively, and the two lenses 236 are disposed between the two TIR prisms 232, 234.

The functions and the purpose of the light recycling unit 23 will be described thereinafter. Referring to FIG. 5, when the light source system 2 for stereoscopic projection operates in the first time sequence, the reflecting region of the color wheel module 24 rotates to a position corresponding to the light source 222 so that the first light beam emitted by the light source 222 is reflected by the reflecting region of the color wheel module 24. However, the first light beam reflected by the reflecting region can be guided by the light recycling unit 23 to the filtering region of the color wheel module 24.

Similarly, referring to FIG. 6, when the light source system 2 for stereoscopic projection operates in the second time sequence, the reflecting region of the color wheel module 24 rotates to a position corresponding to the light source 224 so that the second light beam emitted by the light source 224 is reflected by the reflecting region of the color wheel module 24. The second light beam thus can be guided by the light recycling unit 23 to the filtering region of the color wheel module 24.

Given above, by means of the light recycling unit 23 both the first light beam and the second light beam can be guide and transmit to the filtering region of the color wheel module 24 and partially pass through the filtering region of the color wheel module 24. Therefore, contrast to the previous embodiment, the brightness of the light beams outputted by the light source system 2 into the light valve of the projector can be increased significantly.

The process after the first light beam and the second light beam reaching the filtering region of the color wheel module 24 is similar to that in the first embodiment, and is thus omitted from description.

Figure 7:
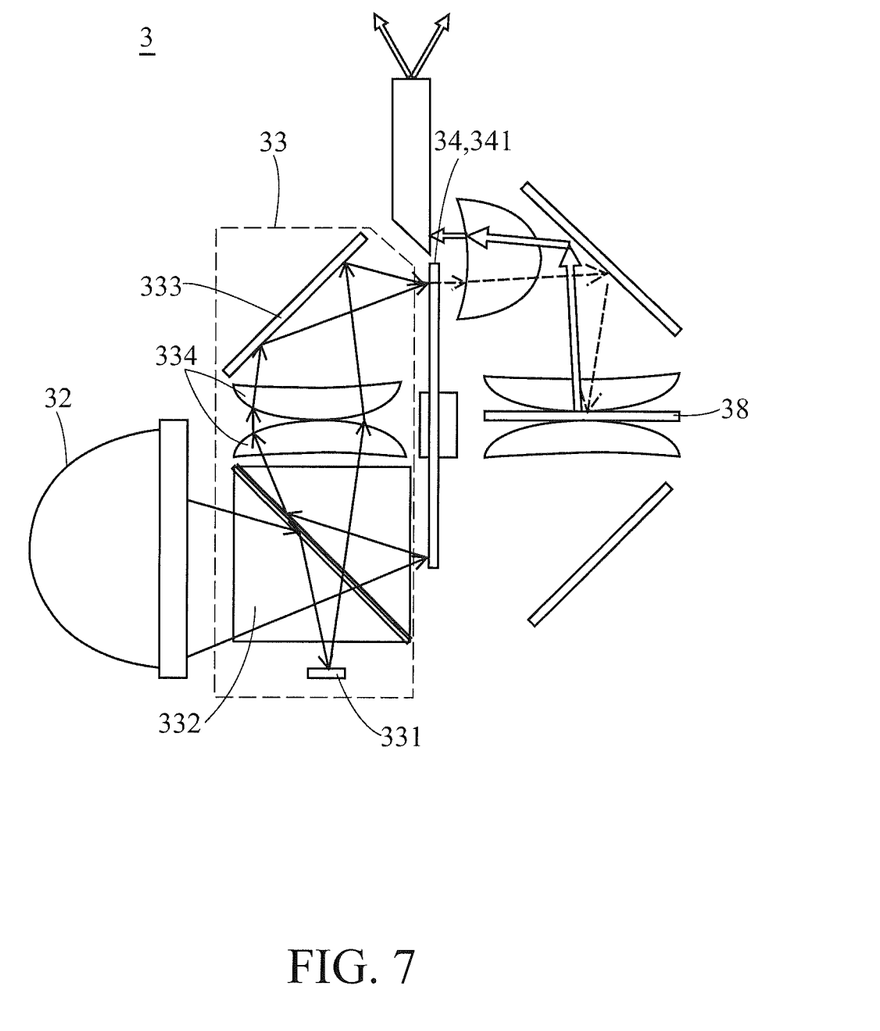
FIG. 7 is a schematic view illustrating a light path of a third embodiment of the light source system for stereoscopic projection according to the present invention in the first time sequence.
Figure 8:
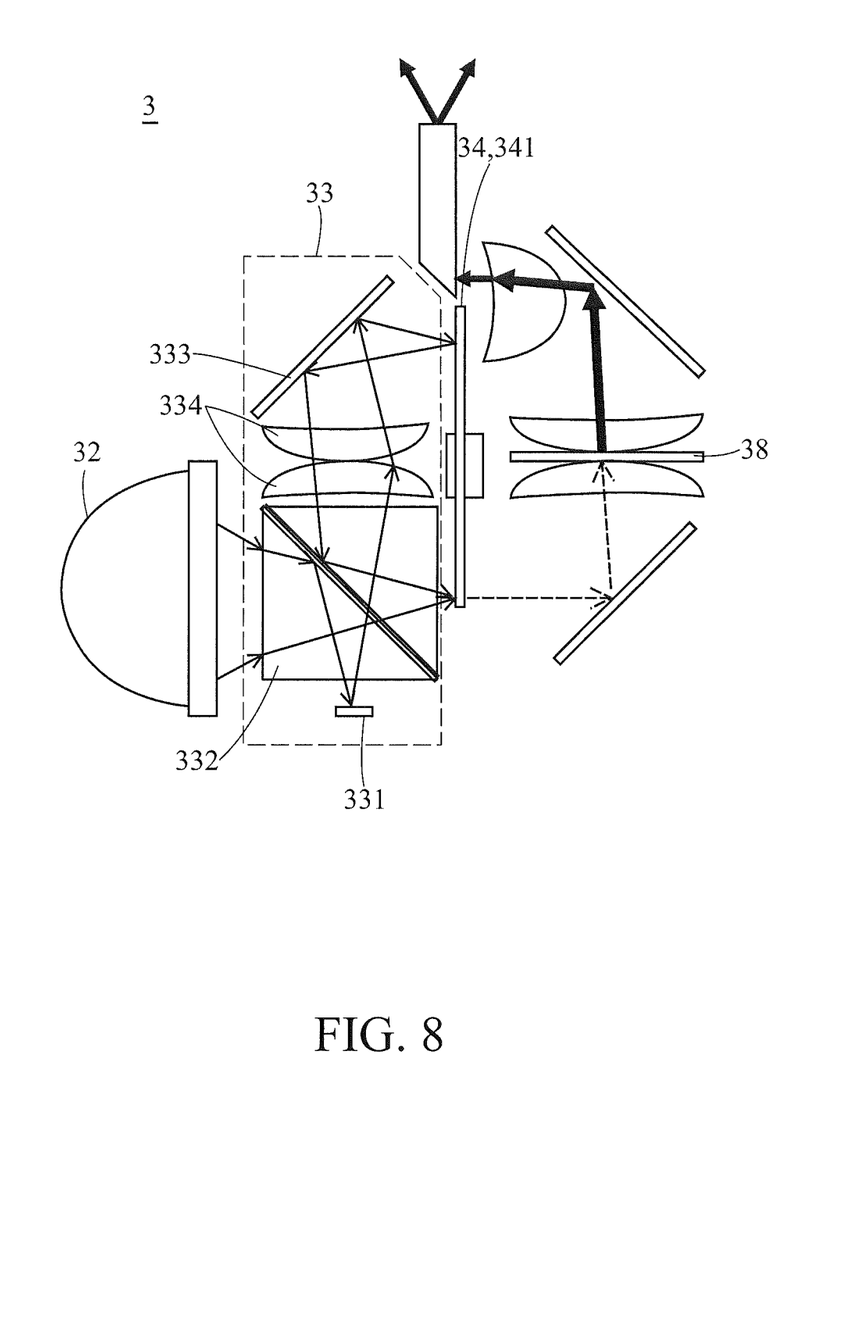
FIG. 8 is a schematic view illustrating a light path of the third embodiment of the light source system for stereoscopic projection according to the present invention in the second time sequence.
Figure 9:
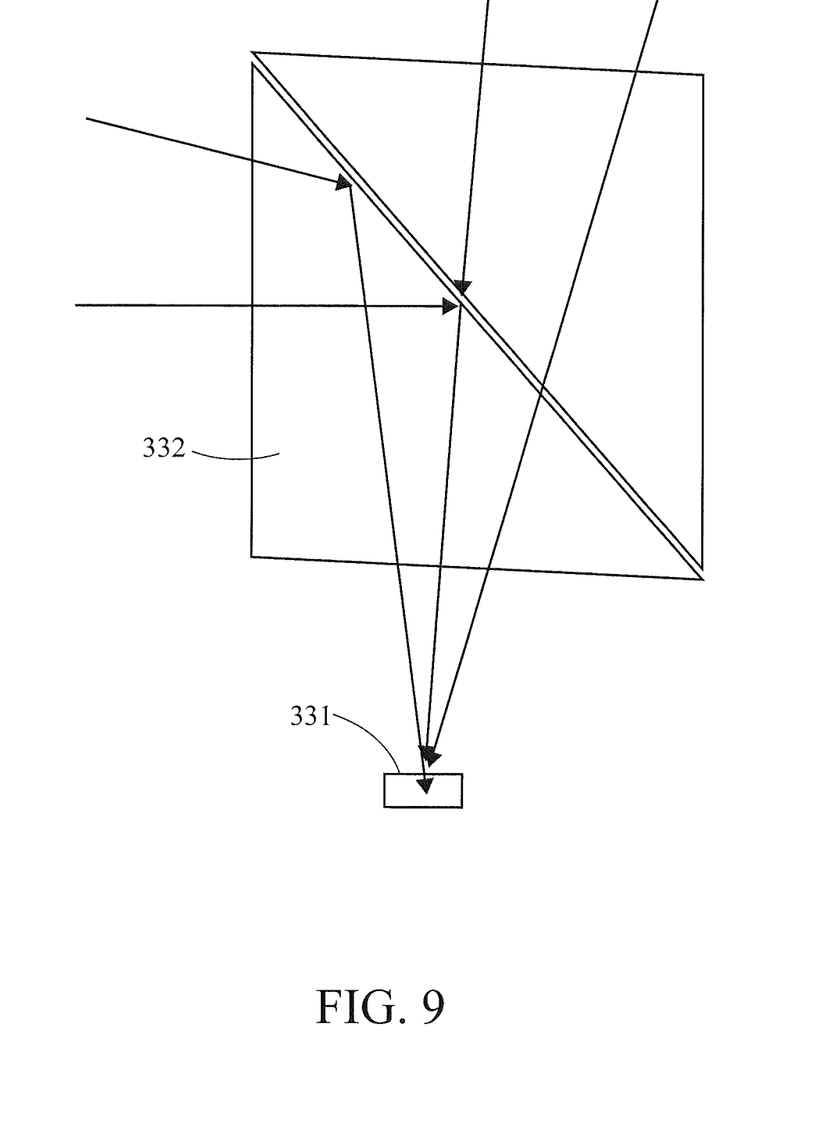
FIG. 9 is a schematic view illustrating some elements of a light splitting unit in the third embodiment of the light source system for stereoscopic projection according to the present invention.

Referring to FIG. 7 to FIG. 9, FIG. 7 and FIG. 8 are schematic views illustrating light paths of a third embodiment of the light source system for stereoscopic projection according to the present invention in the first time sequence and the second time sequence respectively; and FIG. 9 is a schematic view illustrating a portion of a light splitting unit of the light source module in the third embodiment of the light source system for stereoscopic projection according to the present invention.

Similar to the light source system 1 or 2 for stereoscopic projection in the first or second embodiment, the light source system 3 for stereoscopic projection of this embodiment also comprises such elements as a color wheel module 34, a multiband filter 38 and reflectors. However, different from the light source systems 1 or 2 for stereoscopic projection, the light source system 3 for stereoscopic projection only comprises one light source 32 in combination with one light splitting unit 33 to achieve the functions similar to those of the light source systems 1 or 2.

In detail, the light source module of the light source system 3 for stereoscopic projection comprises a light source 32 and a light splitting unit 33. The light source 32 is adapted to generate a light beam. The light splitting unit 33 optically couples with the light source 32, and is disposed between the light source 32 and the rotary wheel 341 (both the light splitting unit 33 and the light source 32 are disposed at the first side of the rotary wheel 341 of the color wheel module 34) to split or divide the light beam generated by the light source 32 into the first light beam and the second light beam.

The light splitting unit 33 may comprise: a first reflective element 331, a TIR prism 332, a second reflective element 333 and two lenses 334. The TIR prism 332 is disposed between the first reflective element 331 and the second reflective element 333. The two lenses 334 are symmetrically disposed with respect to the axial direction of the rotary wheel 341 of the color wheel module 34 and are disposed between the TIR prism 332 and the second reflective element 333.

Referring to FIG. 9, according to the property of the TIR prism 332, a light beam will be reflected by an air layer of the TIR prism 332 if the incident angle of the light beam is larger than the critical angle of the TIR prism, and otherwise, the light beam will pass through the air layer of the TIR prism 332. According to this property, the light beam generated by the light source 32 can be divided into the first light beam and the second light beam.

Referring to FIG. 7, when the light source system 3 for stereoscopic projection operates in the first time sequence, the light source 32 corresponds to the reflecting region (as shown in FIG. 3) of the color wheel module 34, and the light beam generated by the light source 32 enters into the TIR prism 332 of the light splitting unit 33.

The second light beam is a specific part, which has an initial incident angle larger than the critical angle of the TIR prism 332, included in the light beam. The second light beam is reflected by the TIR prism and transmits to the first reflective element 331 and then reflected back into the TIR prism 332. At this time, the incident angle of the second light beam becomes smaller than the critical angle, so the second light beam could pass through the TIR prism 332. Via the two lenses 334, the second light beam is reflected by the second reflective element 333 to the filtering region of the color wheel module 34.

On the other hand, those included in the light beam and having an initial incident angle smaller than the critical angle of the TIR prism 332 is defined as a first light beam. Further, the first light beam can pass through the TIR prism 332 directly and is then reflected by the reflecting region of the color wheel module 34. The reflected first light beam propagates back into the TIR prism 332 again (meanwhile the incident angle of the first light beam is changed into a larger angle than the critical angle of the TIR), and is guided by the TIR prism 332 and the second reflective element 333 to the filtering region (as shown in FIG. 3) of the color wheel module 34.

Referring to FIG. 8, while the light source system 3 for stereoscopic projection operates in the second time sequence, the light source 32 corresponds to the filtering region of the color wheel module 34, and the light beam generated by the light source 32 is divided by the light splitting unit 33 into the first light beam and the second light beam. The second light beam propagates to the filtering region of the color wheel module 34, and the first light beam propagates to the reflecting region of the color wheel module 34. After being reflected by the reflecting region, the first light beam is guided by the light splitting unit 33 to the filtering region of the color wheel module 34.

As can be known from the above descriptions, in the light source system 1 for stereoscopic projection of the first embodiment the first light beam or the second light beam are respectively generated by two light sources in different time sequence. While in this embodiment the both of the first light beam or the second light beam are generated by a light source. Therefore, the overall numbers of the light source could be reduced, and the cost of the light source system would be decreased.

The process after the first light beam and the second light beam reaching the filtering region of the color wheel module 34 is similar to that in the first embodiment, and is thus omitted from description.

Figure 10:
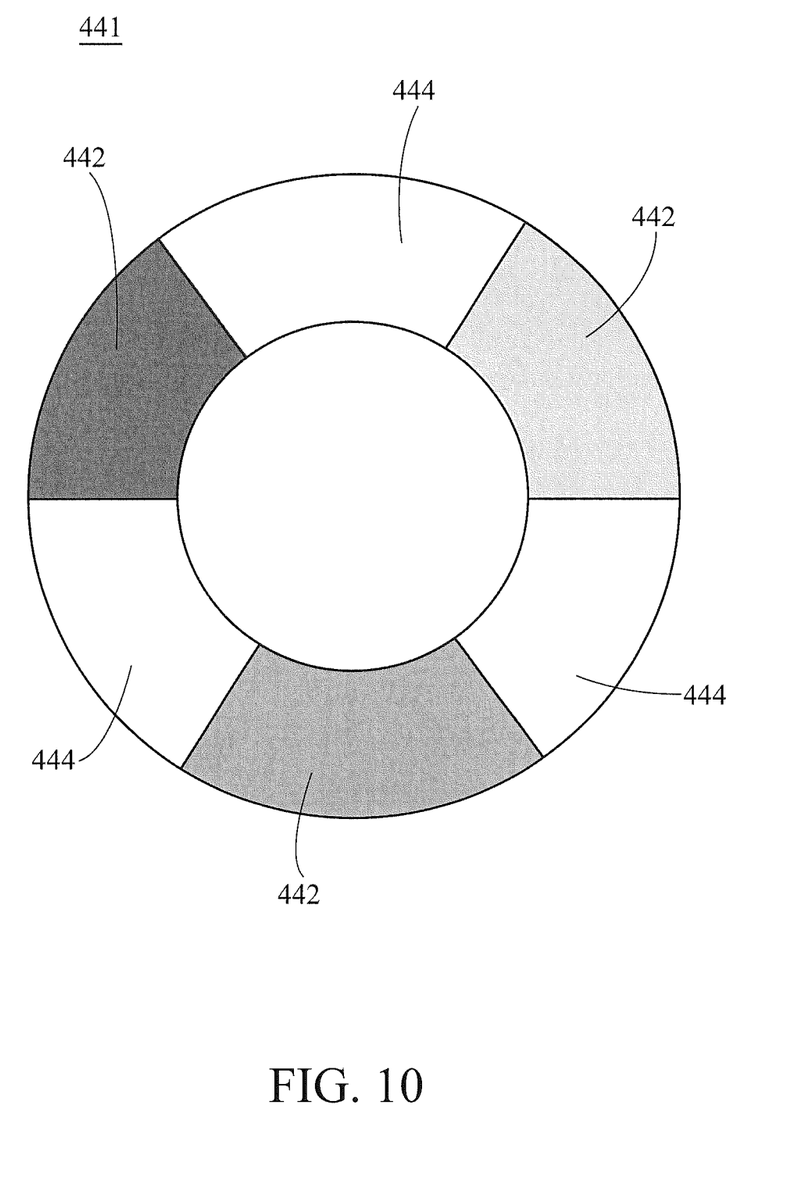
FIG. 10 is a front view illustrating another implementation of the rotary wheel of the color wheel module of the light source system for stereoscopic projection according to the present invention.

Referring to FIG. 10, there is shown a schematic view illustrating another implementation of the rotary wheel of the color wheel module of the light source system for stereoscopic projection according to the present invention. As compared to the color wheel module 14 of the first embodiment, the reflecting region 444 of the rotary wheel 441 of the color wheel module in this embodiment also has three portions, which are arranged alternately with the three portions of the filtering region 442; and the filtering region 442 and the reflecting region 444 are still disposed symmetrically with respect to the radial direction of the rotary wheel 441. When being applied to the light source system 1, 2 or 3 for stereoscopic projection, the rotary wheel 441 can also achieve the same functions and effects as the rotary wheel 141.

In conclusion, the light source system for stereoscopic projection of the present invention can provide light beams of different wavebands to the light valve of the projector in different time sequences so that the projector can project a left-eye view angle image and a right-eye view angle image to the user. Furthermore, the light source system for stereoscopic projection of the present invention at least has a low manufacturing cost, a simplified optical arrangement, a miniaturized volume or improved brightness of the output light beam.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source system for stereoscopic projection, comprising:
    a light source module for providing a first light beam and a second light beam;
    a color wheel module, having a rotary wheel, and the light source module being disposed at a first side of the rotary wheel, wherein the rotary wheel has a filtering region and a reflecting region, the filtering region and the reflecting region are symmetrical with respect to a radial direction of the rotary wheel, the filtering region and the reflecting region are disposed in a light path of the first light beam and a light path of the second light beam respectively, the filtering region is used to allow a third light beam of a first waveband included in the first light beam or the second light beam to transmit therethrough, and the reflecting region is used to reflect the first light beam or the second light beam;
    two reflectors, being disposed at a second side of the rotary wheel, wherein the second side is opposite to the first side, and the filtering region optically couples with the two reflectors as the rotary wheel rotates; and
    a multiband filter, being disposed at the second side of the rotary wheel and being disposed between the two reflectors, wherein the multiband filter optically couples with the two reflectors, the multiband filter is used to allow a fourth light beam of a second waveband included in the third light beam to pass therethrough and used to reflect a fifth light beam of a third waveband included in the third light beam, and the second waveband and the third waveband are contained in the first waveband.

2. The light source system as claimed in claim 1, wherein the third light beam is a red light, a green light, a yellow light or a blue light.

3. The light source system as claimed in claim 1, wherein the light source module comprises two light sources for providing the first light beam and the second light beam respectively.

4. The light source system as claimed in claim 3, wherein the light source module further comprises a light recycling unit which is disposed between the two light sources and the rotary wheel, the light recycling unit is used to guide the first or the second light beam that is reflected by the reflecting region to the filtering region of the rotary wheel.

5. The light source system as claimed in claim 4, wherein the light recycling unit comprises two total internal reflection (TIR) prisms which are symmetrically disposed with respect to an axial direction of the rotary wheel.

6. The light source system as claimed in claim 5, wherein the light recycling unit further comprises two lenses which are symmetrically disposed with respect to the axial direction of the rotary wheel and disposed between the two total internal reflection prisms.

7. The light source system as claimed in claim 1, wherein the light source module comprises a light source and a light splitting unit, the light source is used to provide a light beam, and the light splitting unit optically couples with the light source and is disposed between the light source and the rotary wheel to split the light beam into the first light beam and the second light beam.

8. The light source system as claimed in claim 7, wherein the light splitting unit comprises a total internal reflection prism, a first reflective element and a second reflective element, and the total internal reflection prism is disposed between the first and the second reflective elements.

9. The light source system as claimed in claim 8, wherein the light splitting unit further comprises two lenses, which are symmetrically disposed with respect to the axial direction of the rotary wheel and are disposed between the total internal reflection prism and the second reflective element.

10. The light source system as claimed in claim 1, further comprising a light homogenizing element optically coupling with one of the two reflectors, wherein the light homogenizing element is a lens array, a fly lens, an integration rod or a light tunnel.

11. The light source system as claimed in claim 6, further comprising a light homogenizing element optically coupling with one of the two reflectors, wherein the light homogenizing element is a lens array, a fly lens, an integration rod or a light tunnel.

12. The light source system as claimed in claim 8, further comprising a light homogenizing element optically coupling with one of the two reflectors, wherein the light homogenizing element is a lens array, a fly lens, an integration rod or a light tunnel.

13. The light source system as claimed in claim 1, further comprising two first lens units being symmetrically disposed with respect to an axial direction of the rotary wheel and disposed at two opposite sides of the multiband filter.

14. The light source system as claimed in claim 6, further comprising two first lens units being symmetrically disposed with respect to an axial direction of the rotary wheel and disposed at two opposite sides of the multiband filter.

15. The light source system as claimed in claim 8, further comprising two first lens units being symmetrically disposed with respect to an axial direction of the rotary wheel and disposed at two opposite sides of the multiband filter.

* * * * *